United States Patent
Hu

(10) Patent No.: US 9,994,324 B2
(45) Date of Patent: *Jun. 12, 2018

(54) DEICER BOOTS HAVING DIFFERENT ELASTOMER FIBERS

(71) Applicant: Goodrich Corporation, Charlotte, NC (US)

(72) Inventor: Jin Hu, Hudson, OH (US)

(73) Assignee: Goodrich Corporation, Charlotte, NC (US)

( * ) Notice: Subject to any disclaimer, the term of this patent is extended or adjusted under 35 U.S.C. 154(b) by 184 days.

This patent is subject to a terminal disclaimer.

(21) Appl. No.: 15/140,048

(22) Filed: Apr. 27, 2016

(65) Prior Publication Data

US 2016/0347458 A1   Dec. 1, 2016

Related U.S. Application Data

(60) Provisional application No. 62/166,548, filed on May 26, 2015.

(51) Int. Cl.
  *B64D 15/00*   (2006.01)
  *B64D 15/16*   (2006.01)
  *C08K 3/04*    (2006.01)

(52) U.S. Cl.
  CPC .......... *B64D 15/00* (2013.01); *B64D 15/166* (2013.01); *C08K 3/04* (2013.01)

(58) Field of Classification Search
  CPC ....... B64D 15/166; B29C 70/14; B29C 70/18; B29C 70/42; D01D 5/003
  See application file for complete search history.

(56) References Cited

U.S. PATENT DOCUMENTS

| 4,613,102 A | * | 9/1986 | Kageorge | B64D 15/166 244/134 A |
| 4,687,159 A | * | 8/1987 | Kageorge | B64D 15/166 244/134 A |

(Continued)

FOREIGN PATENT DOCUMENTS

| EP | 0720946 A1 | * | 7/1996 | ............. B64D 15/00 |
| EP | 0720946 A1 |   | 7/1996 | |

(Continued)

OTHER PUBLICATIONS

W.K. Son et al., "Preparation of Antimicrobial Ultrafine Cellulose Acetate Fibers with Silver Nanoparticles", from Macromolecular Rapid Communication, 2004, pp. 1632-1637.

(Continued)

*Primary Examiner* — Justin M Benedik
(74) *Attorney, Agent, or Firm* — Kinney & Lange, P.A.

(57) ABSTRACT

A deicer boot includes a plurality of first elastomer fibers and a first carbon allotrope material selected from the group consisting of carbon nanotubes, graphene, graphite and carbon black. The first carbon allotrope material is aligned with one of the first elastomer fibers. The deicer boot also includes a plurality of second elastomer fibers and a second carbon allotrope material selected from the group consisting of carbon nanotubes, graphene, graphite and carbon black. The second carbon allotrope material is aligned with one of the second elastomer fibers. The second elastomer fibers are different from the first elastomer fibers.

20 Claims, 2 Drawing Sheets

(56) References Cited

U.S. PATENT DOCUMENTS

| | | | | |
|---|---|---|---|---|
| 4,690,353 | A | * | 9/1987 | Haslim ................ B64D 15/163 244/134 D |
| 5,098,037 | A | * | 3/1992 | Leffel ................. B64D 15/166 244/134 A |
| 5,164,242 | A | * | 11/1992 | Webster ................ B64D 15/16 156/60 |
| 5,314,145 | A | | 5/1994 | Rauchhorst, III et al. |
| 5,337,978 | A | * | 8/1994 | Fahrner ................ B64D 15/166 244/134 A |
| 5,544,845 | A | | 8/1996 | Giamati et al. |
| 5,558,304 | A | * | 9/1996 | Adams ................. B64D 15/00 244/134 A |
| 5,609,314 | A | * | 3/1997 | Rauckhorst, III ..... B64D 15/16 244/134 A |
| 5,743,494 | A | * | 4/1998 | Giamati ................ B64D 15/00 244/134 A |
| 5,921,502 | A | * | 7/1999 | Al-Khalil ............ B64D 15/163 244/134 A |
| 6,352,601 | B1 | * | 3/2002 | Ray ....................... B64D 15/00 156/71 |
| 6,520,452 | B1 | | 2/2003 | Crist et al. |
| 7,070,836 | B2 | | 7/2006 | Czado |
| 7,832,983 | B2 | | 10/2010 | Kruckenberg et al. |
| 8,662,449 | B2 | | 3/2014 | Shah et al. |
| 8,664,573 | B2 | | 3/2014 | Shah et al. |
| 9,598,176 | B2 | * | 3/2017 | Giamati ............... B64D 15/166 |
| 2006/0094320 | A1 | | 5/2006 | Chen et al. |
| 2009/0326128 | A1 | | 12/2009 | Macossary-Torres |
| 2011/0027067 | A1 | | 2/2011 | Kennedy, III et al. |
| 2012/0224897 | A1 | * | 9/2012 | Qi .......................... B82Y 30/00 399/333 |
| 2013/0115420 | A1 | | 5/2013 | Park et al. |
| 2014/0065422 | A1 | | 3/2014 | Kim et al. |

FOREIGN PATENT DOCUMENTS

| | | |
|---|---|---|
| EP | 2724855 A1 | 4/2014 |
| WO | WO2006123858 A1 | 11/2006 |

OTHER PUBLICATIONS

L.Y. Yeo et al., "Electrospinning Carbon Nanotube Ploymer Composite Nanofibers", from Journal of Experimental Nanoscience, Jun. 2006, pp. 177-209.

S. Sirinrath et al., "Skeletal Myotube Formation Enhanced by Electrospun Polyurethane Carbon nanotube Scaffolds", from International Journal of Nanomedicine, 2011, pp. 2483-2497.

M. Gopiraman et al., "Structural and Mechanical Properties of Cellulose Acetate/Graphene Hybrid Nanofibers: Spectroscopic Investigations", from eXPRESS Polymer Letters, 2013, pp. 554-563.

Q. Dong et al., "Ultrasound-assisted Preparation of Electrospun Carbon Nanofiber/Graphene Composite Electrode for Supercapacitors", from Journal of Power Sources, 2013, pp. 350-353.

Extended European Search Report for Application No. 16171019.9, dated Sep. 30, 2016, 7 Pages.

* cited by examiner

DEICER BOOTS HAVING DIFFERENT ELASTOMER FIBERS

CROSS-REFERENCE TO RELATED APPLICATION(S)

This application claims the benefit of U.S. Provisional Application No. 62/166,548 filed May 26, 2015 for "Deicer Boots Having Different Elastomer Fibers" by Jin Hu.

BACKGROUND

Accumulation of ice on aircraft wings and other aircraft structures during flight is a known issue. A variety of techniques have been used to remove ice from aircraft during flight including chemical deicing (applying chemicals to aircraft structures to reduce ice adhesion forces or reduce the freezing point of water that collects on the aircraft), thermal deicing (actively heating aircraft structures to prevent ice formation or loosen accumulated ice), and pneumatic deicing (using inflatable elements to expand the profile of an aircraft structure to crack accumulated ice).

Some state of the art pneumatic deicers (sometimes called deicer boots) employ a neoprene or polyester urethane outer layer positioned over a natural rubber inner layer, which is connected to an aircraft structure. Inflation tubes are positioned between the inner layer and the aircraft structure. The inflation tubes inflate causing portions of the outer and inner layers to move away from the aircraft structure. This movement deforms the outer layer so that ice that has accumulated on the outer layer cracks and is shed from the outer layer. Neoprene and polyester urethane outer layers generally possess adequate toughness, wind and sand erosion resistance, and chemical resistance to fuel and oil, but do not generally retract well at low temperatures. The natural rubber inner layer is used to improve the elasticity and retractability of the outer layer. The present disclosure describes improved compositions for deicer boots.

SUMMARY

A deicer boot includes an aircraft structure and an outer layer. The outer layer includes a plurality of first elastomer fibers and a plurality of second elastomer fibers. The plurality of first elastomer fibers include a first elastomer body and a first carbon allotrope material selected from the group consisting of carbon nanotubes, graphene, graphite and carbon black. The plurality of second elastomer fibers includes a second elastomer body and a second carbon allotrope material selected from the group consisting of carbon nanotubes, graphene, graphite and carbon black. The second elastomer fibers are different from the first elastomer fibers.

A deicer boot includes a plurality of first elastomer fibers and a first carbon allotrope material selected from the group consisting of carbon nanotubes, graphene, graphite and carbon black. The first carbon allotrope material is aligned with one of the first elastomer fibers. The deicer boot also includes a plurality of second elastomer fibers and a second carbon allotrope material selected from the group consisting of carbon nanotubes, graphene, graphite and carbon black. The second carbon allotrope material is aligned with one of the second elastomer fibers. The second elastomer fibers are different from the first elastomer fibers.

A method of forming a deicer boot includes aligning a first carbon allotrope material selected from the group consisting of carbon nanotubes, graphene, graphite and carbon black with a plurality of first elastomer fibers to form a plurality of first fibers; aligning a second carbon allotrope material selected from the group consisting of carbon nanotubes, graphene and carbon black with plurality of second elastomer fibers to form a plurality of second fibers, wherein the second fibers are different from the first fibers; incorporating the first and second fibers into a sheet; and applying the sheet to an aircraft structure to form the deicer boot.

DETAILED DESCRIPTION

The present disclosure describes elastomeric deicer boots having improved elasticity and mechanical strength compared to the currently deployed neoprene and polyurethane deicer boots.

Figure 1:
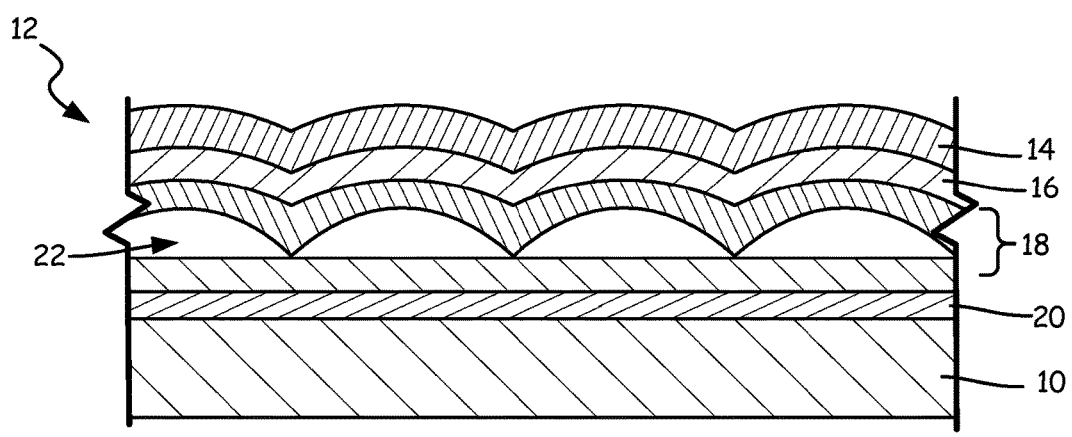
FIG. 1 is a perspective view of a pneumatic deicer boot in a distended condition.

FIG. 1 illustrates an aircraft component having a deicer boot according to the present disclosure. As shown in FIG. 1, aircraft component 10 is a wing. However, aircraft component 10 can also be a fairing, strut or any other externally exposed aircraft structure that can accumulate ice during operation of the aircraft. Deicer boot 12 includes outer layer 14, inner layer 16, carcass layer 18 and bond layer 20.

Outer layer 14 is located on the external surface (or breezeside) of aircraft component 10. The composition of outer layer 14 is described in greater detail below. Inner layer 16 is located between outer layer 14 and aircraft structure 10. According to the prior art, inner layer 16 provides support for the retraction of outer layer 14. Inner layer 16 often contains a natural rubber. According to the present disclosure, inner layer 16 can be present as shown in FIG. 1. Alternatively, the composition of outer layer 14 allows for the omission of inner layer 16 entirely. Carcass layer 18 is located between inner layer 16 and aircraft structure 10. Carcass layer 18 includes inflation tubes 22. Inflation tubes 22 communicate with an air supply located on the aircraft (not shown). When air from the air supply is delivered to inflation tubes 22, inflation tubes 22 expand causing carcass layer 18, inner layer 16 and outer layer 14 to move away from aircraft structure 10. FIG. 1 shows outer layer 14 in a distended condition (i.e. inflation tubes 22 are pressurized). This movement causes accumulated ice on outer layer 14 to crack and be removed from outer layer 14.

In prior art deicer boots, the outer layer typically contained neoprene or a polyester urethane, and the inner layer was typically a natural rubber. The neoprene or polyester urethane elastomer layer provided erosion and chemical resistance, but had relatively poor elasticity at low temperatures. The natural rubber layer provided the elasticity needed for the outer layer to retract and reform to the aircraft structure once the inflation tubes were deflated. A carbon material (e.g., carbon black) could be added to the prior art elastomer layer to improve conductivity and reduce the likelihood of static discharge and provide additional strength. However, the carbon material was generally added to the elastomer in a non-ordered fashion (i.e. simple mixing). This resulted in a random distribution of carbon material throughout the elastomer layer. According to the present disclosure, outer layer 14 possesses the necessary strength, erosion resistance, and elasticity to eliminate the need for the natural rubber layer used in prior art deicer boots and yields a breezeside layer that has advantages compared to an elastomer containing randomly distributed carbon black.

In some embodiments of the present disclosure, outer layer 14 is a non-woven fiber fabric sheet that includes pluralities of elastomer fibers. Suitable elastomer fibers include neoprene, polyurethanes, natural rubbers and any other elastomers used to form the outer layer of a deicer boot. The elastomer fibers can be nanofibers (diameters less than 1000 nanometers) or microfibers (diameters smaller than a strand of silk) or a mixture of nanofibers and microfibers. The non-woven fiber fabric sheet of outer layer 14 also includes a carbon allotrope material that is aligned with one or more of the plurality of elastomer fibers. The carbon allotrope material is aligned with an elastomer fiber so that it is contained within or on the surface of the elastomer fiber. Suitable carbon allotrope materials include carbon nanotubes, graphene, graphite and carbon black. Carbon nanotubes can be single-walled carbon nanotubes or multi-walled carbon nanotubes. By aligning the carbon allotrope materials with elastomer fibers, which are subsequently fused, melted or cured into solid sheets, the non-woven fiber fabric sheet of outer layer 14 is strengthened when compared to elastomer sheets that are formed by simply mixing an elastomer with a carbon material in a non-ordered fashion.

In one embodiment of the present disclosure, an elastomer fiber and the carbon allotrope material is aligned by electrospinning the elastomer fiber with the carbon allotrope material. Electrospinning uses an electric charge to draw a very fine fiber from a polymer solution. When a sufficiently high voltage is applied to a liquid droplet, the liquid becomes charged and electrostatic repulsion counteracts the surface tension of the droplet causing the droplet to stretch. Once a critical point is reached, a stream of liquid erupts from the surface of the droplet. Where the molecular cohesion of the liquid is sufficiently high, a charged liquid jet is formed. The jet is elongated due to electrostatic repulsion initiated at small bends in the fiber and is deposited on a grounded collector. The jet dries in flight, resulting in a uniform fiber due to the elongation and thinning of the fiber due to the bending instability caused by the electrostatic repulsion. The polymer (e.g., polyurethane) solution can include the carbon allotrope material so that when the solution is electrospun, the carbon allotrope material is contained within the resulting electrospun fiber.

Figure 2:
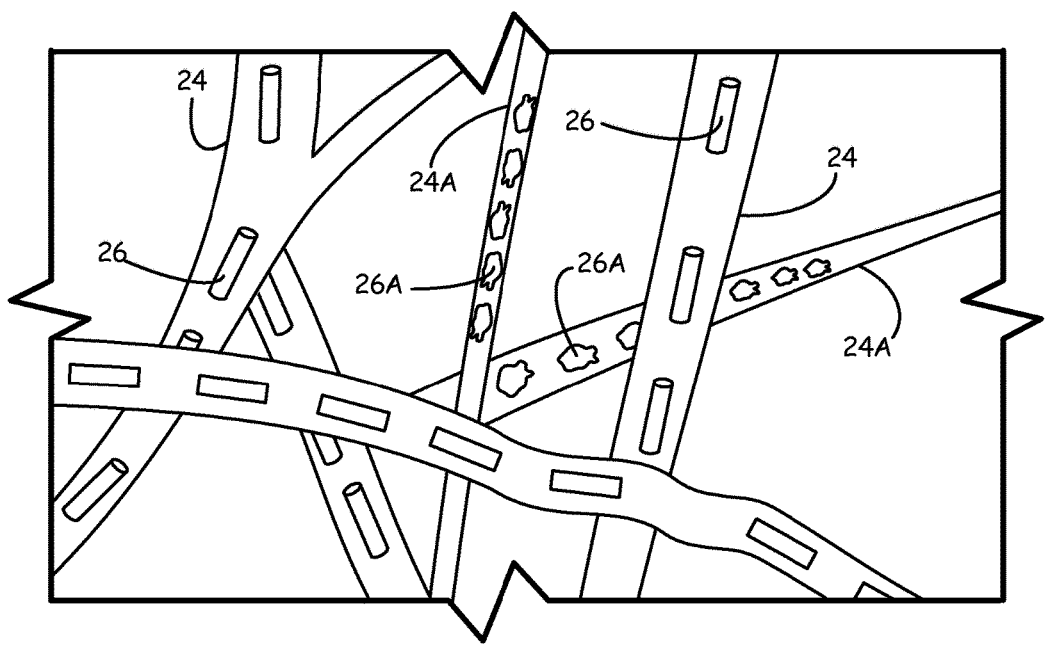
FIG. 2 is a schematic view of carbon material aligned with nanofibers by electro spinning.

FIG. 2 schematically illustrates one example of a carbon allotrope material contained within an elastomer fiber. Elastomer fiber 24 is formed at the spinning tip of an electrospinning apparatus (not shown). The electrospinning apparatus can include a power supply and pump for delivering the elastomer solution. Elastomer fiber 24 has aligned carbon allotrope material 26 by electrospinning as described above. While some amount of "tangling" or "intertwining" can occur during electrospinning, the elastomer fibers and carbon allotrope material form a non-woven fiber fabric. A number of elastomer fibers, some with aligned carbon allotrope materials, are joined together to form the non-woven fiber fabric sheet.

Not all elastomer fibers in the non-woven fiber fabric have aligned carbon allotrope material. In some embodiments, only a portion of the elastomer fibers contain a carbon allotrope material. The loading of carbon allotrope material in the elastomer fibers of outer layer 14 can vary. In embodiments where conductivity is the primary concern, the carbon allotrope material can have a relatively low loading. For example, the non-woven fiber fabric sheet of outer layer 14 can contain about 0.5% carbon nanotubes by weight to provide outer layer 14 with the necessary conductivity to prevent static discharges that can damage outer layer 14 and aircraft structure 10. This loading level also provides more mechanical strength benefits than non-aligned carbon nanotubes at the same concentration. In other embodiments, the non-woven fiber fabric of outer layer 14 can contain about 0.5% graphene or carbon black by weight. In embodiments where mechanical strength is a primary concern, the carbon allotrope material can have a heavier loading. For example, the non-woven fiber fabric of outer layer 14 can contain up to about 5% carbon nanotubes by weight to improve the strength and erosion resistance of outer layer 14. In other embodiments, the non-woven fiber fabric of outer layer 14 can contain up to about 5% graphene or carbon black by weight.

Outer layer 14 includes elastomer fibers of at least two different compositions. That is, outer layer 14 includes two or more combinations of elastomer fibers and carbon allotrope materials. In one embodiment, a single type of elastomer fiber (e.g., polyurethane) is used in both fiber compositions and one set of fibers uses a first type of carbon allotrope material (e.g., graphene) and another set of fibers uses a second type of carbon allotrope material different from the first (e.g., carbon black). In another embodiment, a single type of carbon allotrope material (e.g., carbon nanotubes) is used in both sets of fibers and one set of fibers contains a first type of elastomer fiber (e.g., neoprene) and the other set of fibers contains a second type of elastomer fiber different from the first (e.g., polyurethane). In yet another embodiment, the two sets of fibers contain different concentrations of carbon allotrope materials. In this case, the elastomer type and carbon allotrope materials can be the same in each set of fibers or different. For example, one set of fibers can contain carbon black as the carbon allotrope material at a first concentration and another set of fibers can contain a second concentration of carbon black that is different from the first concentration. In some embodiments, the ratio of concentrations of carbon allotrope material in the higher loading fibers and the lower loading fibers is between about 1:9 and 4:6. In one embodiment, the ratio of carbon allotrope material in the higher loading fiber and the lower loading fiber is about 1:4. By varying the amount of carbon allotrope material loading in different sets of fibers, outer layer 14 can be constructed so that it provides the necessary conductivity and mechanical strength while maintaining a lower overall carbon allotrope loading than those layer containing non-aligned carbon materials.

Two sets of different elastomer fibers are illustrated in FIG. 2. Elastomer fibers 24 contain carbon nanotubes 26, while elastomer fibers 24A contain carbon black 26A. In some embodiments, the non-woven fiber fabrics with elastomer fibers 24 and 24A and aligned carbon allotrope material 26 and 26A are melted and/or cured following electrospinning to form a fabric sheet that can be applied as outer layer 14 to aircraft structure 10.

As described above, a method of forming a layer of a deicer boot includes the steps of aligning a first carbon allotrope material with first elastomer fibers to form a set of first fibers, aligning a second carbon allotrope material with second elastomer fibers to form a set of second fibers, incorporating the first and second fibers into a sheet, and applying the sheet to an aircraft structure. The step of aligning the elastomer fibers with the carbon allotrope material can include electrospinning. Carbon allotrope materials can be electrospun with the elastomer fibers so that the carbon allotrope materials are contained within or on the fibers. Separate spinning tips can be used to electrospin the first and second sets of fibers. The first and second sets of fibers can be electrospun simultaneously by the separate spinning heads. The first and second fibers can be fused, melted or cured together to form the sheet.

Forming outer layer 14 using two different kinds of elastomer fibers provides a number of benefits compared to conventional deicer boots. Aligning carbon allotrope materials with elastomer fibers at different loading levels as disclosed herein provides a non-woven fiber fabric sheet that possesses benefits as a component of a deicer boot. The presence of elastomer fibers with varying carbon loading levels improves the overall elasticity of the deicer boot layer while still maintaining the necessary conductivity to prevent static discharge. It also lowers the overall carbon loading of the layer. By using different types of elastomers and/or carbon allotrope materials, outer layer 14 can be optimized to provide the necessary strength, structural integrity and conductivity needed for specific flight applications.

DISCUSSION OF POSSIBLE EMBODIMENTS

The following are non-exclusive descriptions of possible embodiments of the present invention.

A deicer boot can include an aircraft structure and an outer layer. The outer layer can include a plurality of first elastomer fibers and a plurality of second elastomer fibers. The plurality of first elastomer fibers can include a first elastomer body and a first carbon allotrope material selected from the group consisting of carbon nanotubes, graphene, graphite and carbon black. The plurality of second elastomer fibers can include a second elastomer body and a second carbon allotrope material selected from the group consisting of carbon nanotubes, graphene, graphite and carbon black. The second elastomer fibers are different from the first elastomer fibers.

The deicer boot of the preceding paragraph can optionally include, additionally and/or alternatively, any one or more of the following features, configurations and/or additional components:

A further embodiment of the foregoing deicer boot can include that the first elastomer fibers and the second elastomer fibers are fused, melted or cured to form a single solid sheet.

A further embodiment of any of the foregoing deicer boots can include an inner elastomer layer located between the outer layer and the aircraft structure, a carcass layer having inflation tubes and located between the aircraft structure and the inner layer, and a bond layer adjacent the carcass layer and configured to attach the carcass layer to the aircraft structure.

A further embodiment of any of the foregoing deicer boots can include that the first and second elastomer bodies comprise a material selected from the group consisting of neoprene, polyurethane, natural rubbers and combinations thereof.

A further embodiment of any of the foregoing deicer boots can include that a composition of the first elastomer body is different from a composition of the second elastomer body.

A further embodiment of any of the foregoing deicer boots can include that the first elastomer fibers have a greater concentration of carbon allotrope material than the second elastomer fibers.

A further embodiment of any of the foregoing deicer boots can include that the first carbon allotrope material comprises carbon nanotubes, and wherein the second carbon allotrope material comprises carbon black, and wherein a ratio of first carbon allotrope material to second carbon allotrope material in the non-woven fiber fabric sheet is between 1:9 and 4:6.

A further embodiment of any of the foregoing deicer boots can include that the first carbon allotrope material comprises graphene, and wherein the second carbon allotrope material comprises carbon black.

A deicer boot can include a plurality of first elastomer fibers and a first carbon allotrope material selected from the group consisting of carbon nanotubes, graphene, graphite and carbon black. The first carbon allotrope material can be aligned with one of the first elastomer fibers. The deicer boot also can include a plurality of second elastomer fibers and a second carbon allotrope material selected from the group consisting of carbon nanotubes, graphene, graphite and carbon black. The second carbon allotrope material can be aligned with one of the second elastomer fibers. The second elastomer fibers are different from the first elastomer fibers.

The deicer boot of the preceding paragraph can optionally include, additionally and/or alternatively, any one or more of the following features, configurations and/or additional components:

A further embodiment of the foregoing deicer boot can include that the first elastomer fibers have a greater concentration of carbon allotrope material than the second elastomer fibers.

A further embodiment of any of the foregoing deicer boots can include that the first and second elastomer fibers comprise a material selected from the group consisting of neoprene, polyurethane, natural rubbers and combinations thereof.

A further embodiment of any of the foregoing deicer boots can include that a composition of the first elastomer fibers is different from a composition of the second elastomer fibers.

A method of forming a deicer boot can include aligning a first carbon allotrope material selected from the group consisting of carbon nanotubes, graphene, graphite and carbon black with a plurality of first elastomer fibers to form a plurality of first fibers; aligning a second carbon allotrope material selected from the group consisting of carbon nanotubes, graphene and carbon black with a plurality of second elastomer fibers to form a plurality of second fibers, where the second fibers are different from the first fibers; incorporating the first and second fibers into a sheet; and applying the sheet to an aircraft structure to form the deicer boot.

The method of the preceding paragraph can optionally include, additionally and/or alternatively, any one or more of the following features, configurations and/or additional components:

A further embodiment of the foregoing method can include that aligning the first carbon allotrope material with the plurality of first elastomer fibers is carried out by electrospinning a first elastomer solution with the first carbon allotrope material, and wherein aligning the second carbon allotrope material with the plurality of second elastomer fibers is carried out by electrospinning a second elastomer solution with the second carbon allotrope material.

A further embodiment of any of the foregoing methods can include that electrospinning the plurality of first elastomer fibers is performed by a first electrospinning tip, and wherein electrospinning the plurality of second elastomer fibers is performed by a second electrospinning tip different from the first electrospinning tip.

A further embodiment of any of the foregoing methods can include that electrospinning the plurality of first elastomer fibers and electrospinning the plurality of second elastomer fibers occurs simultaneously.

A further embodiment of any of the foregoing methods can include that incorporating the first and second fibers into the sheet comprises fusing or melting the first and second fibers.

A further embodiment of any of the foregoing methods can include that the sheet is a neoprene or polyurethane sheet, and wherein incorporating the first and second fibers into the sheet comprises embedding the first and second fibers into the sheet.

A further embodiment of any of the foregoing methods can include that the first and second elastomer fibers comprise a material selected from the group consisting of neoprene, polyurethane, natural rubbers and combinations thereof.

A further embodiment of any of the foregoing methods can include that the first carbon allotrope material comprises carbon nanotubes, and wherein the second carbon allotrope material comprises carbon black, and wherein a ratio of first carbon allotrope material to second carbon allotrope material in the sheet is between 1:9 and 4:6.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A deicer boot for attachment to an aircraft structure, the deicer boot comprising:
   an outer layer comprising:
      a plurality of first elastomer fibers comprising:
         a first elastomer body; and
         a first carbon allotrope material selected from the group consisting of carbon nanotubes, graphene, graphite and carbon black, wherein the first carbon allotrope material is contained within or on a surface of the first elastomer body; and
      a plurality of second elastomer fibers comprising:
         a second elastomer body; and
         a second carbon allotrope material selected from the group consisting of carbon nanotubes, graphene, graphite and carbon black, wherein the second carbon allotrope material is contained within or on a surface of the second elastomer body and wherein the second elastomer fibers are different from the first elastomer fibers.

2. The deicer boot of claim 1, wherein the first elastomer fibers and the second elastomer fibers are fused, melted or cured to form a single solid sheet.

3. The deicer boot of claim 1, further comprising:
   an inner elastomer layer located between the outer layer and the aircraft structure;
   a carcass layer having inflation tubes and located between the aircraft structure and the inner layer;
   a bond layer adjacent the carcass layer and configured to attach the carcass layer to the aircraft structure.

4. The deicer boot of claim 1, wherein the first and second elastomer bodies comprise a material selected from the group consisting of neoprene, polyurethane, natural rubbers and combinations thereof.

5. The deicer boot of claim 1, wherein a composition of the first elastomer body is different from a composition of the second elastomer body.

6. The deicer boot of claim 1, wherein the first elastomer fibers have a greater concentration of carbon allotrope material than the second elastomer fibers.

7. The deicer boot of claim 2, wherein the first carbon allotrope material comprises carbon nanotubes, and wherein the second carbon allotrope material comprises carbon black, and wherein a ratio of first carbon allotrope material to second carbon allotrope material in the non-woven fiber fabric sheet is between 1:9 and 4:6.

8. The deicer boot of claim 1, wherein the first carbon allotrope material comprises graphene, and wherein the second carbon allotrope material comprises carbon black.

9. A deicer boot comprising:
   a plurality of first elastomer fibers;
   a first carbon allotrope material selected from the group consisting of carbon nanotubes, graphene, graphite and carbon black, wherein the first carbon allotrope material is contained within or on a surface of the first elastomer fibers and is aligned with one of the first elastomer fibers;
   a plurality of second elastomer fibers; and
   a second carbon allotrope material selected from the group consisting of carbon nanotubes, graphene, graphite and carbon black, wherein the second carbon allotrope material is contained within or on a surface of the first elastomer fibers and is aligned with one of the second elastomer fibers, wherein the second elastomer fibers are different from the first elastomer fibers.

10. The deicer boot of claim 9, wherein the first elastomer fibers have a greater concentration of carbon allotrope material than the second elastomer fibers.

11. The deicer boot of claim 9, wherein the first and second elastomer fibers comprise a material selected from the group consisting of neoprene, polyurethane, natural rubbers and combinations thereof.

12. The deicer boot of claim 9, wherein a composition of the first elastomer fibers is different from a composition of the second elastomer fibers.

13. A method of forming a deicer boot, the method comprising:
   aligning a first carbon allotrope material selected from the group consisting of carbon nanotubes, graphene, graphite and carbon black with a plurality of first elastomer fibers to form a plurality of first fibers;
   aligning a second carbon allotrope material selected from the group consisting of carbon nanotubes, graphene and carbon black with a plurality of second elastomer fibers to form a plurality of second fibers, wherein the second fibers are different from the first fibers;
   incorporating the first and second fibers into a sheet; and
   applying the sheet to an aircraft structure to form the deicer boot.

14. The method of claim 13, wherein aligning the first carbon allotrope material with the plurality of first elastomer fibers is carried out by electrospinning a first elastomer solution with the first carbon allotrope material, and wherein aligning the second carbon allotrope material with the plurality of second elastomer fibers is carried out by electrospinning a second elastomer solution with the second carbon allotrope material.

15. The method of claim 14, wherein electrospinning the plurality of first elastomer fibers is performed by a first electrospinning tip, and wherein electrospinning the plurality of second elastomer fibers is performed by a second electrospinning tip different from the first electrospinning tip.

16. The method of claim 15, wherein electrospinning the plurality of first elastomer fibers and electrospinning the plurality of second elastomer fibers occurs simultaneously.

17. The method of claim 13, wherein incorporating the first and second fibers into the sheet comprises fusing or melting the first and second fibers.

18. The method of claim 13, wherein the sheet is a neoprene or polyurethane sheet, and wherein incorporating the first and second fibers into the sheet comprises embedding the first and second fibers into the sheet.

19. The method of claim 13, wherein the first and second elastomer fibers comprise a material selected from the group consisting of neoprene, polyurethane, natural rubbers and combinations thereof.

20. The method of claim 13, wherein the first carbon allotrope material comprises carbon nanotubes, and wherein the second carbon allotrope material comprises carbon black, and wherein a ratio of first carbon allotrope material to second carbon allotrope material in the sheet is between 1:9 and 4:6.

* * * * *